United States Patent
Nomura et al.

[11] Patent Number: 5,623,002
[45] Date of Patent: Apr. 22, 1997

[54] MATERIAL FOR CONTACT LENS AND CONTACT LENS PREPARED THEREFROM

[75] Inventors: Masashi Nomura, Saitama-ken; Yuuichi Yokoyama, Kounosu, both of Japan

[73] Assignee: Hoya Corporation, Tokyo, Japan

[21] Appl. No.: 466,701

[22] Filed: Jun. 6, 1995

Related U.S. Application Data

[63] Continuation of Ser. No. 44,893, Apr. 7, 1993, abandoned, which is a continuation of Ser. No. 661,137, Feb. 27, 1991, abandoned.

[30] Foreign Application Priority Data

Feb. 28, 1990 [JP] Japan ............................. 2-48476

[51] Int. Cl.[6] ..................... G02C 7/04; C08F 20/04
[52] U.S. Cl. ................ 523/106; 524/357; 524/358; 524/770; 522/47; 522/48; 522/37; 264/2.6
[58] Field of Search ............... 523/106; 524/357, 524/358, 770; 264/2.6; 522/47, 48, 37

[56] References Cited

U.S. PATENT DOCUMENTS

| | | | |
|---|---|---|---|
| 3,850,892 | 11/1974 | Shen et al. | 351/160 R |
| 3,880,818 | 4/1975 | Shen et al. | 351/160 R |
| 4,054,683 | 10/1977 | Gruber | 427/53 |
| 4,494,954 | 1/1985 | Suminoe et al. | 8/507 |
| 4,668,712 | 5/1987 | Hino et al. | 523/116 |
| 4,719,248 | 1/1988 | Bambury et al. | 523/106 |
| 4,737,556 | 4/1988 | Itoh et al. | 526/245 |
| 4,866,148 | 9/1989 | Geyer et al. | 526/264 |
| 4,889,664 | 12/1989 | Kindt-Larsen et al. | 523/106 |
| 4,921,884 | 5/1990 | Hammer et al. | 523/106 |
| 5,258,024 | 11/1993 | Chavel et al. | 424/429 |

FOREIGN PATENT DOCUMENTS

| | | |
|---|---|---|
| 0228193 | 7/1987 | European Pat. Off. . |
| 0294976 | 12/1988 | European Pat. Off. . |
| 0414219 | 2/1991 | European Pat. Off. . |
| 2167606 | 8/1973 | France . |

*Primary Examiner*—Andrew E. C. Merriam
*Attorney, Agent, or Firm*—Burns, Doane, Swecker & Mathis, L.L.P.

[57] ABSTRACT

Provided is a soft contact lens obtained by visible ray polymerization of a mixture comprising one or more of unsaturated carboxylic acid(s) and one or more visible ray polymerization initiator(s), or a mixture comprising one or more of unsaturated carboxylic acid(s), one or more of unsaturated carboxylate(s) and one or more of visible ray polymerization initiator(s).

7 Claims, No Drawings

MATERIAL FOR CONTACT LENS AND CONTACT LENS PREPARED THEREFROM

This application is a continuation; of application No. 08/044,893, filed Apr. 7, 1993, now abandoned, which is a continuation of application. No. 07/661,137, filed Feb. 27, 1991, now abandoned.

BACKGROUND OF THE INVENTION

1. Field of the Invention

The present invention relates to a material for contact lens and contact lens prepared from the material. More particularly, this invention relates to a material for contact lens obtained by visible ray polymerization and contact lens prepared from this material.

2. Description of Prior Art

In general, a material for contact lens consists of a polymer obtained by polymerization of one or more monomer(s). A contact lens is prepared by molding and processing this material. Thus, properties of the polymer, the material of the contact lens strongly influence on the quality of a contact lens.

Various kinds of materials for contact lens are known. For example, Japanese Patent Publication (KOKOKU) No. 59-33887 discloses a polymer obtained by polymerizing a monomer mixture containing acrylic acid in the presence of a photopolymerization initiator such as benzoin by wide-range ultraviolet ray irradiation. A non-water-containing soft contact lens is obtained by shaping and polishing the resulting polymer into the form of a contact lens and softening the polished lens by esterification and/or transesterification with an alcohol.

Japanese Patent Disclosure (KOKAI) No. 62-229113 discloses a polymer applicable to a material for contact lens. This polymer is obtained by thermal polymerization of a monomer mixture substantially containing fluorinated (meth)acrylate and acrylic acid or alkyl acrylate in the presence of a peroxide or an azo compound, or by ultraviolet ray polymerization of the above monomer mixture in the presence of photopolymerization initiator such as benzoin methyl ether. A contact lens is also obtainable from this polymer by shaping and polishing the polymer into the form of a contact lens and softening the polished lens by esterification and/or transesterification with an alcohol.

In this specification hereafter, (meth)acrylate means both of acrylate and methacrylate.

Since a contact lens is required to be transparent, and to be satisfied with certain properties such as optical properties and form stability, acrylate homopolymers and copolymers such as polymethyl methacrylate are typically used for a contact lens. However, it is hard to obtain acrylate (co)polymers by the heat polymerization method mentioned above. This is because acrylic acid is active to the polymerization reaction and the heat of polymerization is large. In fact, polymerization rate of acrylic acid is fast and exotherm of the polymerization reaction is large. As a result, the control of the polymerization is difficult and the resulting (co)polymer often foams. The foamed (co) polymer is not transparent and is unsuitable as a material for contact lens. Further, in the case where thus obtained (co)polymer is shaped into the form of contact lens and subjected to an esterification treatment with an alcohol to soften the lens, this (co)polymer sweels with the alcohol. The strength of the contact lens prepared from the (co) polymer obtained by the thermal polymerization is insufficient and the contact lens is easily destroyed by the swell.

Polymers obtained by ultraviolet ray polymerization do not have the above mentioned problems but have the other problems. That is, some of monomers used for polymerization or (co)polymers have a group absorbing ultraviolet ray such as an ester group and as a result, it is difficult to obtain a relatively thick (5 to 10 mm) material for contact lens. Additionally, a difference in polymerization state between the surface and the central of a contact lens material, so-called "polymerization strain" makes impossible to obtain a material with uniform properties. Since ultraviolet rays are utilized for the polymerization, it is required to use an aparatus from which ultraviolet rays do not come through during polymerization.

SUMMARY OF THE INVENTION

An object of the present invention is to provide a material for contact lens which is obtained by easily controllable polymerization and which has no polymerization strain.

Another object of the present invention is to provide a material for contact lens which will not be destroyed by an esterification treatment with an alcohol.

Further object of the present invention is to provide a contact lens prepared from the above material for contact lens.

Another object of the present invention is to provide a non-water-containing soft contact lens prepared from the above material for contact lens.

The present invention relates to a material for contact lens obtainable by visible ray polymerization-of a mixture comprising one or more of unsaturated carboxylic acid(s) and one or more of visible ray polymerization initiator(s), or a mixture comprising one or more of unsaturated carboxylic acid(s), one or more of unsaturated carboxylate(s) and one or more of visible ray polymerization initiator(s).

Another aspects of the present invention are a contact lens obtainable by processing the above material, and a non-water-containing soft contact lens obtainalbe by an alcohol treatment of the processed lens or the above material.

DETAILED DESCRIPTION OF THE INVENTION

This invention will be set forth in detail below:

In the present invenion, the unsaturated carboxylic acid is exemplified by a compound represented by general formula (I) below:

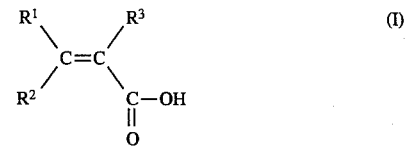

In the formula, $R^1$, $R^2$ and $R^3$ are the same or different and represent a hydrogen atom, a halogen atom, a substituted or unsubstituted alkyl group, a carboxyl group, a carboxylate group, or a substituted or unsubstituted silyl group.

In the above formula (I), examples of the halogen atom include a fluoro atom, a chloro atom and a bromo atom. The alkyl group is preferably a lower alkyl with 1 to 6 carbon atoms and examples of the substituent include a carboxyl group and a carboxylate group. An alkyl moiety of the carboxylate is preferably a lower alkyl with 1 to 6 carbon atoms and the alkyl moiety may have a substituent such as a trifluoromethane group. A substituent of the silyl group is, for example, a lower alkyl group with 1 to 3 carbon atoms and the mumber of the substituents may be from 1 to 3.

Examples of the unsubstituted carboxylic acid represented by formula (I) are listed below:

(i) Monocarboxylic acid acrylic acid methacrylic acid crotonic acid

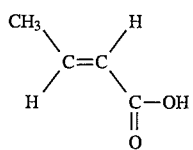

angelic acid

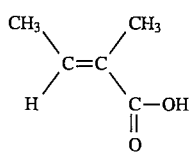

α-acetoxyacrylic acid

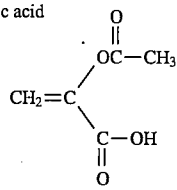

α-trimethlysilylacrylic acid

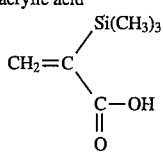

α-fluoroacrylic acid

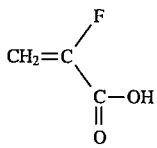

(ii) Dicarboxylic acid and monoester thereof maleic acid

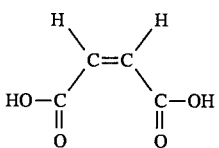

monomethyl maleate

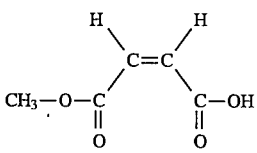

monobutyl itaconate

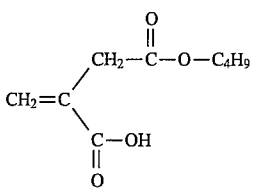

cis-glutaconic acid

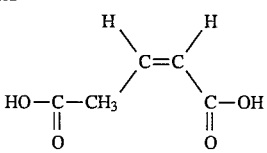

monotrifluoroethyl fumarate

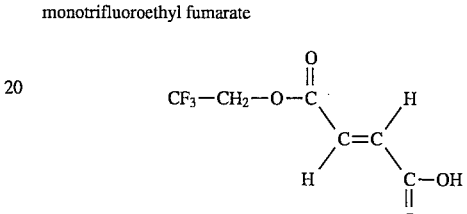

In this invention, a compound represented by general formula (II) is exemplified as the unsubstituted carboxylate:

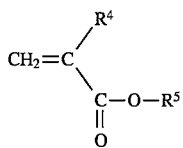

(II)

In the formula, $R^4$ represents a hydrogen atom or an alkyl group, preferably a lower alkyl group having 1 to 6 carbon atoms. More preferably, $R^4$ represents a hydrogen atom or a methyl group.

$R^5$ represents a substituted or unsubstituted alkyl group, or a substituted or unsubstituted heterocyclic group. The alkyl group is preferably a lower alkyl group having 1 to 6 carbon atoms. An example of the carboxylate wherein $R^5$ is an unsubstituted alkyl group is a compound represented by formula (III). Examples of the carboxylate wherein $R^5$ is a substituted alkyl group include an alkoxyl derivative represented by formula (IV), a fluorinated alkyl derivative represented by formula (V), a fluorinated alkoxyl derivative represented by formula (VI) and a silicone derivative represented by formula (VII). Examples of the heterocyclic group include an oxygen containing heterocylcic group having 3 to 6 carbon atoms and a compound represented by formula (VIII) is exemplified as the heterocyclic compound. An alkyl group with 1 to 3 carbon atoms is exemplified as a substituent of the heterocylic group.

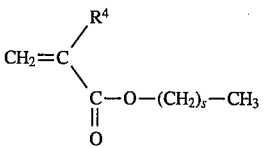

(III)

In the formula, s is an integer from 1 to 5.

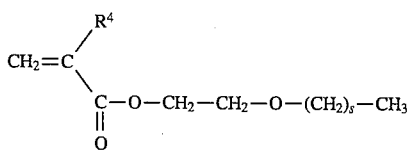
(IV)

In the formula, s is an integer from 1 to 5.

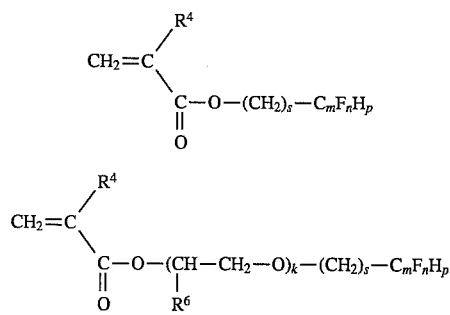
(V)

(VI)

In formulas (V) and (VI), s is an integer of 1 or 2, m is an integer from 4 to 10, n is an integer of 8 or more and p is an integer of $2m+1-n$. In formula (VI), $R^6$ represents a hydrogen atom or a methyl group and k is an integer from 1 to 5.

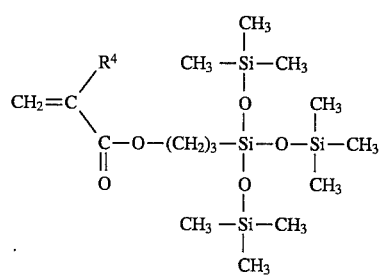
(VII)

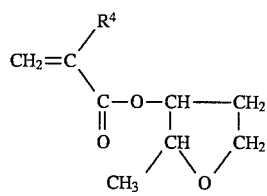
(VIII)

Examples of the compound represented by formula (III) include ethyl (meth)acrylate, methyl (meth)acrylate, propyl (meth)acrylate, n-butyl (meth)acrylate and the like.

Examples of the compound represented by formula (IV) include butoxyethyl (meth)acrylate and the like.

Examples of the compound represented by formula (V) include the following compounds:

Perfluorooctylethyl acrylate

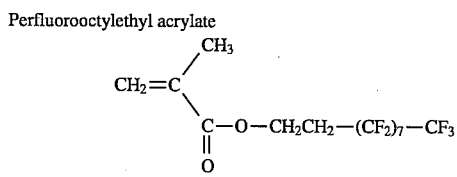

Perfluorooctylethyl methacrylate

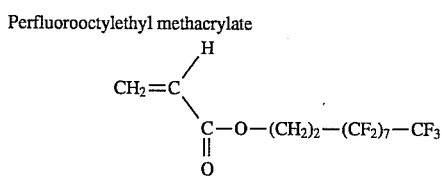

-continued
2,2,3,3,4,4-hexafluoro-1,1,4-trihydrobutyl methacrylate

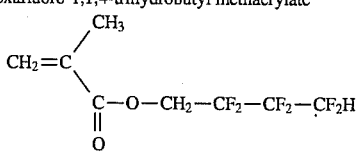

Examples of the compound represented by formula (VI) include the following compounds:

Perfluorooctylethyloxypropylene methacrylate

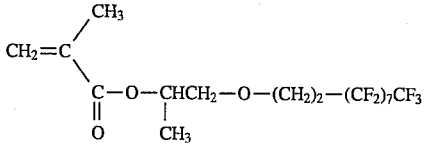

Perfluorooctylethyloxypropylene acrylate

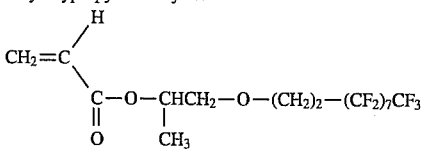

Perfluorooctylethyloxyethylene methacrylate

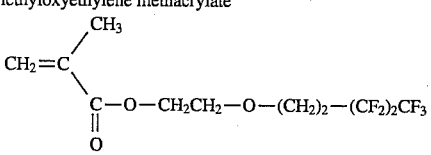

Perfluorooctylethyloxyethylene acrylate

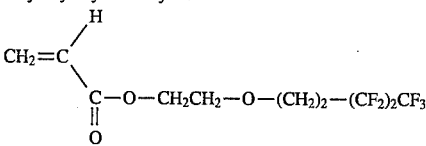

The above mentioned unsaturated carboxylates have the following advantages:

Among the compounds represented by formula (III), acrylates make a lens flexible and improve the compatibility of monomers. Methacrylates improve the strength of a lens and the compatibility of monomers.

Alkoxyethyl (meth)acrylates represented by formula (IV) and heterocyclic (meth)acrylates represented by formula (VIII) improve the compatibility of monomers and the flexibility of a lens. Fluorinated (meth)acrylates represented by (V) and (VI) and silicone-containing (meth) acrylates improve oxygen permeability of a lens.

The content of the unsaturated carboxylic acid and unsaturated carboxylate in a mixture can be chosen properly in view of properties required to a copolymer such as flexibility and oxygen permeability, and a composition of the copolymer, especially compatibility. The unsaturated carboxylate advantageously improves the oxygen permeability of a contact lens and controls the strength and flexibility of a contact lens.

In this invention, the content of the unsaturated carboxylic acid in the mixture ranges from 100 to 0.1 parts and that of the unsaturated carboxylate ranges from 0 to 99.9 parts. It is provided that in this text, "parts" means "parts by weight".

In the case of a non-water-containing soft contact lens, the content of an unsaturated carboxylic acid preferably ranges from 20 to 80 parts and that of the unsaturated carboxylate preferably ranges from 80 to 20 parts. If the content of the acid is less than 20 parts, the flexibility of a lens which has been subjected to transesterification or/and esterification tends to be poor. If the content of the acid is more than 80 parts, the above mentioned advantages resulting from the unsaturated carboxylate tends to be a little.

In the case of a water-containing soft contact lens, the content of the unsaturated carboxylic acid preferably ranges from 20 to 80 parts and that of the unsaturated carboxylate preferably ranges from 80 to 20 parts. If the content of the acid is less than 20 parts, the flexibility of a lens tends to be poor. If the content of the acid is 20 more than 80 parts, the above mentioned advantages resulting from the unsaturated carboxylate tends to be a little.

In the case of a hard contact lens, the content of the unsaturated carboxylic acid preferably ranges from 1 to 20 parts and that of the unsaturated carboxylate preferably ranges from 99 to 80 parts. If the content of the acid is less than 1 parts, the hydrophilic nature resulting from carboxyl groups tends to be poor. If the content of the acid is more than 20 parts, the resulting polymer tends to be opaque.

In this invention, a visible ray polymerization initiator(s) is used as a polymerization initiator. An α-diketon compound is effective as the visible ray polymerization initiator and examples of the α-diketon compound include d,1-camphorquinone, benzyl, diacetyl, acenaphthenequinone, 9,10-phenanthrenequinone and the like. Particularly, d,1-camphorquinone and benzyl are preferred. The amount of the visible ray polymerization initiator used suitably ranges between 0.01 and 2 parts by weight, preferably between 0.05 and 0.5 parts by weight against 100 parts by weight of the unsaturated carboxylic acid or the sum of the unsaturated carboxylic acid and the unsaturated carboxylate. It is provided that when a crosslinking monomer mentioned below is used, the amount of the the visible ray polymerization initiator is chosen on the basis of 100 parts by weight of the sum of the unsaturated carboxylic acid, the unsaturated carboxylate and the crosslinking monomer. If the amount of the visible ray polymerization initiator is too small, polymerization is hard to occur. If the amount of the initiator is too much, the resulting polymer tends to be colored.

In this invention, in addition to the unsaturated carboxylic acid, the visible ray polymerization initiator and if neccesary the unsaturated carboxylate, a crosslinking monomer(s) can be used optionally.

The crosslinking monomer improves the retention of shape of a contact lens and prevents the excessive swell in an alcohol during the estrification. Examples of the crosslinking monomer include ethyleneglycol di(meth)acrylate, diethyleneglycol di(meth)acrylate, triethyleneglycol di(meth)acrylate, allyl (meth)acrylate, glycerol di(meth)acrylate, trimethylolpropane, tri(meth)acrylate, 1,4-butandiol di(meth)acrylate, triallylisocyanurate, divinylbenzene and the like.

These monomers can be used alone or as a mixture of 2 or more of the monomers. The amount of the crosslinking monomers used suitably ranges between 0.01 and 10 parts by weight against 100 parts by weight of a monomer or a monomer mixture used for (co)polymerization.

In this invention, a mixture of the unsaturated carboxylic acid, the visible ray polymerization initiator and if neccesary the crosslikning monomer, or a mixture containing this mixture and the unsaturated carboxylate is polymerized by irradiation of visible light. These mixtures are mixed thoroughly before the polymerization.

The polymerization is conducted by filling a polymerization vessel or a vessel for making a lens shape made of, for instance polypropylene, from which a polymer can easily be taken out, with the above-mentioned mixture. Then the vessel is irradiated visible light. It is suitable to use visible light having a wavelength between 350 and 700 nm, preferably between 380 and 600 nm. The amount of the light is suitably in the range of from 1 to 50 mJ/cm$^2$ per 1 minute, preferably from 2 to 20 mJ/cm$^2$ per 1 minute. This is because a proper polymerization rate is obtainable under these conditions. The measurement of the amount of light is carried out by an integrating actinometer UIT-102 produced by USHIO ELECTRONICS CORPORATION with a receptor calibrating the absolute value by a wavelength of 436 nm. Any light sources can be used. Exmples of the sources include a halogen lamp, a xenon lamp, a white fluorescent light, tungsten lamp and light emitting diode.

The polymerization rate changes depending on the amount of the initiator and the amount of light. It is preferred to choose a polymerization period from about 5 hours or more from the viewpoint of prevention of inner strain of a polymer. There is no upper limit of the polymerization period but from the practical viewpoint, about 72 hours is the suitable upper limit.

A polymerization temperature is generally controlled at room temperature and if neccesary, the temperature may be raised to between 40° C. and 150° C. step by step or continuously during the polymerization. In order to complete the polymerization, a reaction mixture may be heated at, for example from 70° C. to 150° C. during the latter half of the polymerization.

The resulting (co)polymer, a material for contact lens, is taken out from the polymerization vessel, shaped and polished by a conventional method to obtain a contact lens.

One example of the method will be set forth below. A surface of the resulting polymer piece is shaped to a concave by a spherical surface lathe and then the concave is polished. The concave surface is adhered to a treatment tool with a hot melt adhesive. At the adhesion, the center line of the polymer piece is fitted to the center line of the tool. After adhesion, the remaining surface of the polymer piece is shaped to a convex by a spherical surface lathe and then the convex is polished. The adhered tool and polymer piece are heated to remove the piece from the tool and the polymer piece is washed to obtain a lens shape product.

A contact lens shape product is also obtainabe by the method utilizing a mold. For example, a contact lens shape product is prepared by visible light polymerization in a set of a mold having a concave and a mold having a convex which have 50% or more of visible light transmittance. The curvatures of the concave and the convex are chosen on the basis of those of a desirable contact lens.

Further, a lens shape product is prepared by pouring a monomer mixture in a mold with a convex or a concave, sealing a mouth of the mold with a transparent or semi-transparent film, irradiating visible light to the monomer mixture in the mold, shaping the non-curved surface of the molded polymer by a spherical surface lathe, and polishing the shaped surface.

A contact lens obtained by the above-mentioned method is transparent and hard, and classified into 3 groups. The first one is a hard contact lens which has 3% or less of water absorption in water. The second one is a flexible water-containing soft contact lens which has 20% or more of water content in water. The third one is a non-water-containing contact lens which is obtained by esterification with an alcohol.

In this invention, a non-water-containing soft contact lens is substantially equivalent to a non-hydrous soft contact lens, no water absorbable soft contact lens, an elastic soft contact lens or an elastomeric soft contact lens. A water-containing soft contact lens is substantially equivalent to a hydrous soft contact lens or hydrogel type polymer soft contact lens. A hard contact lens is substantially equivalent to a rigid contact lens.

A water-containing soft contact lens is obtainable by a conventional method and is obtained by hydrating and swelling the contact lens shape product. For example, the product is immersed in a physiological saline containing sodium carbonate, sodium hydrogencarbonate, potassium hydrogencarbonate, and/or the like at room temperature or with heating, and then immersed in a physiological saline and allowed to stand at room temperature or heated while the physiological saline is renewed several times, to obtain a hydrated and swollen one.

A purpose of the esterification with an alcohol is to lower a glass transition temperature to make a polymer flexible. The alcohol may contain any of primary, secondary and tertiary hydroxyl groups. In particular, it is preferred to use a monohydric primary alcohol having 1 to 7 carbon atoms, prefarably 3 to 7 carbon atoms.

A preferred alcohol is represented by the formula ZOH. In the formula, Z represents:
(1) hydrocarbon having 1 to 11 carbon atoms; or
(2) formulas $-CH_2$, $CH_2$, $OY$, $-CH_2CH_2(OY)CH_3$, $-CH_2CH_2CH_2OY$, $-CH_2(CH_3)CH_2OY$ and $-CH_2CH_2CH_2CH_2OY$ (wherein Y represents an alkyl group having 1 to 7, preferably 1 to 3 carbon atoms). The above hydrocarbon group is a saturated hydrocarbon group. Examples of the hydrocarbon group include alkyl, cycloalkyl, aralkyl, alkylcycloalkyl and cycloalkylalkyl groups, and an alkyl moiety is a straight chain or branched one. The hydrocarbon is preferably an alkyl group.

Examples of typical and useful alcohol are methanol, ethanol, n-propanol, 1-propanol, n-butanol, s-butanol, t-butanol, pentanol-2, n-pentanol, n-hexanol, heptanol-2, octanol, nonanol, decanol and alcohols equivalent to these alcohols, especially alcohols containing 8 or less carbon atoms; cyclohexanol, benzylalcohol, hexahydrobenzylalcohol, 1,4-cyclohexandiol, cyclopentanol, 2-methylcyclopentanol and cyclic alcohols equivalent to these alcohols; 2methoxyethanol, 2-methoxypropanol, 1,2-ethoxyethanol, 2-(n-propoxy)-ethanol, 3-(n-propoxy)-n-propanol, 3-methoxy-n-butanol, 4-(n-propoxy)-m-butanol, 4-ethoxy-n-butanol and alkoxyalkanols equivalent to these alcohols; glycol, 1,4-butandiol, 1,3-propandiol, 1,2-dihydroxybutane, 1,3-dihydroxybutane and dihydroxyl alcohols equivalent to these alcohols. N-propanol and n-butanol are preferred alcohols.

The esterification with an alcohol is conducted in the presence of an acid catalyst. Examplse of the acid catalyst include sulfuric acid, phosphoric acid, organic acids such as p-toluenesulfonic acid, trifluoromethanesulfonic acid and methanesulfonic acid, acetic acids such as acetic acid and trifluoroacetic acid, and solid acids such as zeolite, Ti-silicagel, acid clay and Nafion.

The amount of the acid catalyst is preferably in the range of from 0.1 to 5%. If the amount is less than 0.1%, the reaction is hard to proceed. The reaction is not accelerated further even if it is more than 5%.

The esterification with an alcohol is suitably conducted, for example at between room temperature and a boiling point of the alcohol for 16 to 72 hours.

After the esterification treatment, the resulting lens is immersed in a solvent at room temperature to substitute the solvent for the alcohol and then immersed in distilled water or an isotonic buffer solution at 60° C. to 100° C. for 2 to 24 hours to attain to equilibrium. These conditions are preferred since equilibrium is easily established. The solvent is preferably an organic solvent having a boiling temperature of 85° C. or less and may be a mixture of two or more of solvents. It is provided that the solvent should be compatible with the used alcohol. Examples of the solvent include alkanes such as n-hexane, 2-methylpentane, 2,2-dimethylbutane; aromatic hydrocarbons such as benzene, toluene, xylene, ethylbenzene; alcohols such as methanol, ethanol, iso-propanol; ethers such as diethylether, dipropylether, tetrahydrofuran; ketones such as acetone, methylethylketone; fluorocarbons; halogenated hydrocarbons such as chloroform, carbon tetrachloride, propyl bromide, 1,1,2-trichloro-1,2,2-trifluoroethane.

According to this invention, it is possible to provide a material for contact lens which is obtained by easily controlled polymerization and which has no polymerization strain. It is possible to obtain a contact lens exhibiting excellent optical properties and transparency by the use of this material for contact lens.

Further the material for contact lens of the present invention will not be destroyed by swell of the material during the esterification with an alcohol. Thus it is possible to provide a transparent and flexible non-water-containing soft contact lens by using the above material for contact lens.

Since visible light is utilized for the polymerization, it is not required to use an aparatus from which ultraviolet ray does not come through during polymerization.

EXAMPLES

Example 1

50 parts of acrylic acid (hereinafter abbreviated as AA), 25 parts of butyl methacrylate (hereinafter abbreviated as BuMA), 10 parts of methyl methacrylate (hereinafter abbreviated as MMA), 10 parts of butoxyethyl methacrylate (hereinafter BOM), 2 parts of t etrafluorofurfuryl acrylate (hereinafter abbreviated as THFA), 3 parts of triethyleneglycol dimethacrylate (hereinafter abbreviated as 3G) and 0.05 parts of camphorquinone (hereinafter abbreviated as CPQ) as a polymerization initiator were mixed and filled in a polymerization vessel made of polypropylene with 15 mm of diameter and 15 mm of height. Then a mouth of this vessel was sealed with a transparent film. Visible light was irradiated from above for 20 hours to polymerize the mixture. Then the resulting mixture was moved to a warm air drying machine previously set at 50° C. and heated at 50° C. for 10 hours, at 60° C. for 2 hours, at 70° C. for 2 hours, at 80° C. for 2 hours, at 90° C. for 2 hours and at 110° C. for 4 hours to complete polymerization thoroughly. It is provided that the temperature was raised between each temperatures for an hour. After heating, the product was allowed to stand to cool and taken out from the vessel.

The resultant copolymer was transparent and hard. The copolymer was shaped into a contact lens and polished to obtain a contact lens.

The lens was subjected to esterification by heating in n-butanol containing 1% of sulfuric acid as a catalyst at a boiling point of n-butanol for 24 hours.

Then the lens was immersed in acetone at room temperautre for 2 hours to substitute acetone for n-butanol and then immersed in hot water at 80° C. for 6 hours to obtain a stable lens. The resulting lens was a transparent and flexible non-water-containing soft contact lens.

It is provided that in this example and in the following examples, a lens was estimated to be transparent when it has 85% or more of transmittance of 450 to 700 nm light in air.

Examples 2, 3 and 5 to 18

In accordance with the procedures of Example 1 excepting that various monomer compositions and mixing ratio listed in Table 1 were used, contact lenses of Examples 2, 3 and 5 to 18 were obtained.

Example 4

50 parts of AA, 45 parts of perfluorooctylethyl-oxypropylene methacrylate (hereinafter abbreviated as RfPOMA), 2 parts of THFA, 3 parts of 3G and 0.05 parts of CPQ as a polymerization initiator were mixed and filled in a polymerization vessel made of polypropylene with 15 mm of diameter and 15 mm of height. Then a mouth of this vessel was sealed with a transparent film. Visible light was irradiated from above for 20 hours to polymerize the mixture. Then the resulting mixture was moved to a warm air drying machine previously set at 50° C. and heated at 50° C. for 10 hours, at 60° C. for 2 hours, at 70° C. for 2 hours, at 80° C. for 2 hours, at 90° C. for 2 hours and at 110° C. for 4 hours to complete polymerization thoroughly. It is provided that the temperature was raised between each temperatures for an hour. After heating, the product was allowed to stand to cool and taken out from the vessel.

The resultant copolymer was transparent and hard. The copolymer was shaped into a contact lens shape and polished to obtain a contact lens.

The lens was subjected to esterification by heating in n-butanol containing 1% of sulfuric acid as a catalyst at 100° C. for 24 hours.

Then the lens was immersed in acetone at room temperautre for 2 hours to substitute n-butanol and then dipped in hot water at 80° C. for 6 hours to obtain a stable lens. The resulting lens was a transparent and flexible non-water containing soft contact lens.

Example 19

60 parts of AA, 15 parts of RfPOMA, 10 parts of MMA, 10 parts of BOM, 2 parts of THFA, 3 parts of 3G and 0.01 parts of CPQ as a polymerization initiator were mixed and filled in a polymerization vessel made of polypropylene with 15 mm of diameter and 15 mm of height. Then a mouth of this vessel was sealed with a transparent film. Visible light was irradiated from above for 20 hours to polymerize the mixture. Then the resulting mixture was moved to a warm air drying machine previously set at 50° C. and heated at 50° C. for 10 hours, at 60° C. for 2 hours, at 70° C. for 2 hours, at 80° C. for 2 hours, at 90° C. for 2 hours and at 110° C. for 4 hours to complete polymerization thoroughly. It is provided that the temperature was raised between each temperatures for an hour. After heating, the product was allowed to stand to cool and taken out from the vessel.

The resultant copolymer was transparent and hard. The copolymer was shaped into a contact lens shape and polished to obtain a contact lens.

The lens was immersed in a 0.9% physiological saline at 80° C. for 6 hours (the saline was renewed every 2 hours) to obtain a hydrated and swollen lens. The resulting lens was a transparent and flexible water-containing soft contact lens and the water content of the lens was 30%.

Comparitive Example 1

50 parts of AA, 25 parts of BuMA, 10 parts of MMA, 10 parts of BOM, 2 parts of THFA, 3 parts of 3G and 0.05 parts of azobisisobutyronitrile (hereinafter abbreviated as AIBN) as a polymerization initiator were mixed and filled in a polymerization vessel. The mixture was heat polymerized by heating at 40° C. for 22 hours in a water bath, at 50° C. for 10 hours, at 60° C. for 2 hours, at 70° C. for 2 hours, at 80° C. for 2 hours, at 90° C. for 2 hours and at 110° C. for 4 hours in a warm air drying machine. After heating, esterification, substitution with n-butanol and dipping in warm water were conducted by the same conditions as those of Example 1 to obtain a flexible contact lens.

Comparitive Example 2

In accordance with the procedures of Comparative example 1 excepting that various monomer compositions and mixing ratio listed in Table 1 were used, a soft contact lens was obtained.

Comparative Example 3

In accordance with the procedures of Example 1, excepting that 50 parts of AA, 45 parts of RfPOMA, 2 parts of THFA, 3 parts of 3G and 0.05 parts of benzoin as a polymerization initiator were mixed and polymerized by irradiation of ultraviolet light from a high pressure mercury vapor lamp, a contact lens was obtained.

Strain of copolymers obtained in the above examples and comparative examples was measured by a strain viewer (POLARIZING INSTRUMENT CO., INC. MODEL 207) by a method using a tint plate. Uniformity of color was measured by the naked eyes. Samples without strain or with uniform strain were estimated to be "good" and samples with ununiform strain were estimated to be "bad".

Abbreviations used in examples and comparative examples are as follows:
AA: acrylic acid
MeA: methyl acrylate
IA: itaconic acid
CA: crotonic acid
MAA: metacrylic acid

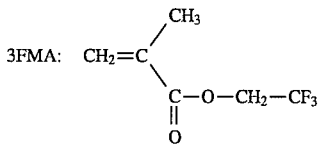

BuA: n-butyl acrylate
BuMA: n-butylmethacrylate

RfPOMA: 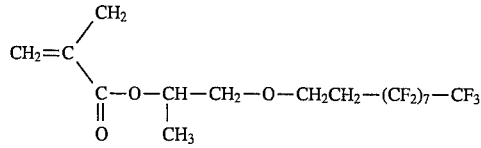
RAV: 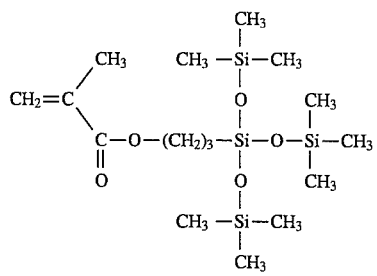
RfMA: 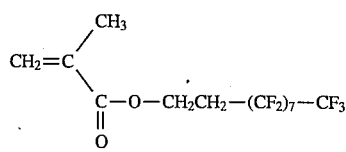
MMA: methyl methacrylate
BOM: 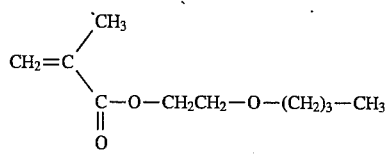
THFA: 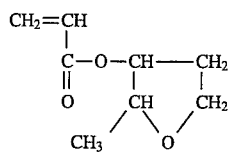
3G: 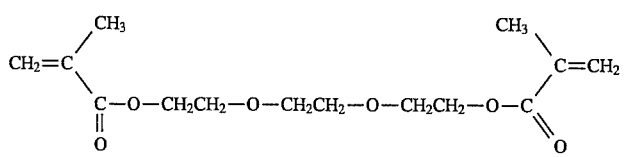
1G: ethyleneglycol dimethacrylate  
CPQ: d,1-camphorquinone  
AIBN: azobisisobutyronitrile  
PX16: bis(4-t-butylcyclohexyl)peroxycarbonate
TABLE 1
| Example No. | AA | MeA | IA | BuA | BuMA | RfPOMA | RAV | RfMA | MMA | BOM | THFA | 3G | 1G | Initiator (Amount) |
|---|---|---|---|---|---|---|---|---|---|---|---|---|---|---|
| 1 | 50 | | | | 25 | | | | 10 | 10 | 2 | 3 | | CPQ (0.05) |
| 2 | 50 | | | | | 25 | | | 10 | 10 | 2 | 3 | | " |
| 3 | 80 | | | | | 15 | | | | | 2 | 3 | | " |
| 4 | 50 | | | | | 45 | | | | | 2 | 3 | | " |
| 5 | 20 | | | | | 75 | | | | | 2 | 3 | | " |
| 6 | 70 | | | | | | 25 | | | | 2 | 3 | | " |
| 7 | 40 | | | | | | 55 | | | | 2 | 3 | | " |
| 8 | 80 | | | | | | | 15 | | | 2 | 3 | | " |
| 9 | 50 | | | | | | | 45 | | | 2 | 3 | | " |
| 10 | 20 | | | | | | | 75 | | | 2 | 3 | | " |
| 11 | 100 | | | | | | | | | | | | | " |
| 12 | 20 | 35 | | | | 10 | 20 | 10 | | | 2 | | 3 | " |
| 13 | 5 | 55 | | 35 | | | | | | | 2 | 3 | | " |

TABLE 1-continued

| | | | | | | | | | | | | | |
|---|---|---|---|---|---|---|---|---|---|---|---|---|---|
| 14 | 40 | | | | 54 | | | | | 5 | 1 | | benzyl (0.15) |
| 15 | | 10 | 60 | | | | | 25 | | 2 | | 3 | CPQ (0.40) |

| Example No. | Polymerization | Strain | Alcohol for ester. | Physical properties of esterified lens |
|---|---|---|---|---|
| 1 | VR | good | BuOH | transparent flexible |
| 2 | " | " | " | " |
| 3 | " | " | " | " |
| 4 | " | " | " | " |
| 5 | " | " | " | " |
| 6 | " | " | " | " |
| 7 | " | " | " | " |
| 8 | " | " | " | " |
| 9 | " | " | " | " |
| 10 | " | " | " | " |
| 11 | " | " | " | " |
| 12 | " | " | " | " |
| 13 | " | " | " | " |
| 14 | " | " | n-propanol | " |
| 15 | " | " | " | " |

| | Monomer (Parts by weight) | | | | | | | | | | | | Initiator |
|---|---|---|---|---|---|---|---|---|---|---|---|---|---|
| Example No. | AA | CA | MAA | 3FMA | BuA | BuMA | RfPOMA | RAV | MMA | BOM | THFA | 3G | 1G | (Amount) |
| 16 | | 5 | | | 60 | | | | 30 | | 3 | 2 | | CPQ (1.80) |
| 17 | | 5 | 15 | | | | | 30 | 45 | | | | 5 | " |
| 18 | | 10 | 45 | | | | | 43 | | | | | 2 | " |
| 19 | 60 | | | | | | | 15 | 10 | 10 | 2 | 3 | | " |
| C. 1 | 50 | | | | | 25 | | | 10 | 10 | 2 | 3 | | AIBN (0.05) |
| 2 | 50 | | | | | | | 25 | 10 | 10 | 2 | 3 | | PX16 (0.05) |
| 3 | 50 | | | | | | | 45 | | | 2 | 3 | | benzoin (0.05) |

| Example No. | Polymerization | Strain | Alcohol for esterifying | Physical properties of esterified lens |
|---|---|---|---|---|
| 16 | VR | good | n-propanol | transparent flexible |
| 17 | " | " | not esterified | transparent hard |
| 18 | " | " | " | " |
| 19 | " | " | " | Water content 30%, transparent, flexible |
| C. 1 | HP | " | BuOH | destroyed |
| 2 | " | " | " | " |
| 3 | UV | bad | " | transparent flexible distorted |

Polymerization
VR: Visible ray polymerization, HP: Heat polymerization, UV: Ultraviolet ray polymerization

What we claim is:

1. A nonwater containing soft contact lens obtained by visible ray polymerization of a mixture consisting essentially of at least one unsaturated carboxylic acid and at least one visible ray polymerization initiator selected from the group consisting of d,1-camphorquinone, diacetyl and acenaphthenequinone, where the unsaturated carboxylic acid is a mono or dicarboxylic acid which is unsubstituted, silyl substituted, fluoroalkyl substituted, perfluoroalkyl substituted or alkyl substituted: and processing the treated material into the soft contact lens including esterification with an alcohol.

2. The nonwater containing soft contact lens of claim 11, wherein the mixture that is visible ray polymerized further contains at least one crosslinking monomer.

3. The nonwater containing soft contact lens of claim 2, wherein the crosslinking monomer is selected from the group consisting of ethyleneglycol di(meth) acrylate, diethyleneglycol di(meth) acrylate, triethyleneglycol di(meth)acrylate, allyl (meth) acrylate, glycerol di(meth)acrylate, trimethylolpropane, tri(meth)acrylate, 1,4-butandiol di(meth)acrylate, triallylisocyanunate and divinylbenzene.

4. The nonwater containing soft contact lens of claim 2, wherein the amount of crosslinking monomer ranges from 0.01 to about 10 parts by weight of the monomer mixture used for polymerization.

5. A process for preparing a nonwater containing soft contact lens comprising irradiating with visible ray irradiation a mixture comprising at least one unsaturated carboxylic acid and at least one visible ray polymerization initiator selected from the group consisting of d,1-camphorquinone, diacetyl and acenaphthenequinone, where the unsaturated carboxylic acid is a mono or dicarboxylic acid which is unsubstituted, silyl substituted, fluoroalkyl substituted, perfluoroalkyl substituted or alkyl substituted;

shaping and polishing the resulting polymerized mixture to form a contact lens; and subjecting the contact lens to esterification with an alcohol.

6. The process of claim 5, wherein the mixture which is subjected to visible ray irradiation also contains at least one crosslinking monomer.

7. The process of claim 6, wherein the crosslinking monomer is selected from the group consisting of ethyleneglycol di (meth) acrylate, diethyleneglycol di (meth) acrylate, triethyleneglycol di (meth) acrylate, allyl (meth) acrylate, glycerol di (meth) acrylate, trimethylolpropane, tri (meth) acrylate, 1,4 -butandiol di (meth) acrylate, triallylisocyanunate and divinylbenzene.

* * * * *